United States Patent
Sekiguchi et al.

[11] Patent Number: 5,161,875
[45] Date of Patent: Nov. 10, 1992

[54] HEAD LAMP FOR CORNERING OPERATION

[75] Inventors: Tsuneo Sekiguchi; Koichi Nagano, both of Tokyo; Satoru Suzuki, Ichikawa, all of Japan

[73] Assignee: Stanley Electric Company, Ltd., Tokyo, Japan

[21] Appl. No.: 748,467

[22] Filed: Aug. 22, 1991

Related U.S. Application Data

[62] Division of Ser. No. 618,409, Nov. 27, 1990.

[30] Foreign Application Priority Data

Nov. 28, 1989 [JP] Japan .................................. 1-308024
Nov. 28, 1989 [JP] Japan .................................. 1-308025

[51] Int. Cl.$^5$ ............................................. B60Q 1/04
[52] U.S. Cl. ........................................ 362/61; 362/80; 362/277; 362/318; 362/351
[58] Field of Search ................... 362/61, 72, 80, 276, 362/277, 303, 318, 351, 293

[56] References Cited

U.S. PATENT DOCUMENTS

| | | | |
|---|---|---|---|
| 1,199,578 | 9/1916 | Latta . | |
| 4,024,388 | 5/1977 | Skoff | 362/72 |
| 4,075,469 | 2/1978 | Alphen | 362/72 |
| 4,870,545 | 9/1989 | Hatanaka et al. | 362/72 |
| 4,875,141 | 10/1989 | Miyauchi et al. | 362/277 |
| 4,922,390 | 5/1990 | Nakazawa et al. | 362/72 |
| 4,985,816 | 1/1991 | Seko et al. | 362/61 |

FOREIGN PATENT DOCUMENTS

| | | | |
|---|---|---|---|
| 267544 | 5/1989 | Fed. Rep. of Germany . | |
| 1245961 | 9/1971 | United Kingdom . | |
| 1339129 | 11/1973 | United Kingdom . | |
| 1451066 | 9/1976 | United Kingdom | 362/318 |
| 2122366 | 1/1984 | United Kingdom | 362/277 |

Primary Examiner—Ira S. Lazarus
Assistant Examiner—Y. Quach
Attorney, Agent, or Firm—Weingarten, Schurgin, Gagnebin & Hayes

[57] ABSTRACT

To correct variation of a property of light orientation induced by inclination of a vehicle body during a cornering operation, a projector type cornering head lamp including an inclination sensor further includes correcting means. When the correcting means is mechanically constructed, it comprises a pair of opening portions formed on a light shielding plate, shutters for closing the opening portions therewith and solenoids for pulling the shutter downwardly in response to an output from the inclination sensor. When the correcting means is electrically constructed, it is constituted by a circular liquid crystal element preferably comprising a supertwistnematic liquid crystal and serving also as a light shielding plate. The liquid crystal element is constructed such that four sector-shaped ranges radially expanding from the center of a circle with an angle of 45 degrees above and below a reference line are divided into fifteen radially extending segments each of which radially expands in the small sector-shaped configuration with an angle of 3 degrees. Alternatively, the liquid crystal element may be constructed by a plurality of horizontal stripe-shaped segments. A half of the segments above the reference line is normally held in a light permeable state, while another half of the segments below the reference line is normally held in a light impermeable state.

3 Claims, 5 Drawing Sheets

HEAD LAMP FOR CORNERING OPERATION

This appliation is a division of application Ser. No. 07/618,407, filed Nov. 27, 1990.

BACKGROUND OF THE INVENTION

1. Field of the Invention

The present invention relates generally to a head lamp for a cornering operation to be performed by a vehicle, especially a motorcycle motorcycle. More particularly, the present invention relates to a so-called cornering head lamp which is constructed to correct variation of the property of light orientation induced by inclination of a vehicle body of the motorcycle during a cornering operation on the road surface.

2. Description of the Related Art

To facilitate understanding of the present invention, a typical conventional cornering head lamp will briefly be described with reference to FIG. 9. In the drawing, the cornering head lamp is generally designated by reference numeral 31. A vehicle body 20 of the motorcycle is equipped with an inclination sensor 21 adapted to be operated by using a supersonic. The head lamp 31 is turnably supported on the vehicle body 20 to turn about an optical axis such that it is turned relative to the ground surface 22 in response to an output from the inclination sensor 21. Specifically, when the vehicle body 20 is inclined as shown in the drawing during a cornering operation and this inclined state is detected by the inclination sensor 22, the head lamp 31 is turnably driven relative to the ground surface 22 by driving means 23, e.g., a motor. An extent of turning movement of the head lamp 31 about the optical axis is determined such that the property of light orientation becomes parallel to the ground surface 22, i.e., assumes the same state as that at the time when the vehicle body 20 stands upright on the ground surface 22. This makes it possible to obviate such a problem that light fails to be correctly irradiated from the head lamp 31 in the forward direction of the motorcycle.

However, since the conventional head lamp 31 is constructed such that the whole head lamp 31 is turned with a large magnitude of load imposed on the driving means 23, it is unavoidable that the head lamp 31 is designed in larger dimensions. This leads to an inconsistent problem that in spite of the requirement for mounting the cornering head lamp on the vehicle body of the motorcycle in view of inclination of the vehicle body during a cornering operation, the head lamp 31 is mounted on a small-sized vehicle, e.g., a motorcycle with much difficulties.

SUMMARY OF THE INVENTION

The present invention has been made with the foregoing background in mind.

An object of the present invention is to provide a cornering head lamp which is entirely free from the aforementioned problems inherent to the conventional cornering head lamp which have been described above with reference to FIG. 9.

Another object of the present invention is to provide a cornering head lamp which assures that variation of a property of light orientation due to inclination of a vehicle body relative to the road surface can reliably be corrected not only by mechanical means but also by electrical means.

To accomplish the above objects, there is provided according to one aspect of the present invention a projector type head lamp for a cornering operation including inclination detecting means for detecting inclination of a vehicle body relative to the road surface and correcting means for correcting variation of a property of light orientation induced by the inclination of the vehicle body relative to the road surface, wherein the correcting means is constructed such that a pair of opening portions each having a substantially rectangular shape of which upper and lower long sides extend in the substantially horizontal direction are formed adjacent to a boundary edge of a light shielding plate disposed in the head lamp and the opening portions are opened or closed by actuating opening/closing means in response to an output from the inclination detecting means.

In the case where variation of the property of light orientation is corrected in the aforementioned mechanical manner, the opening/closing means comprises a pair of shutters and a pair of solenoids for opening or closing the shutters in response to the output from a inclination sensor serving as inclination detecting means. The opening portions are normally closed with the shutter.

The opening/closing means is operated such that when the vehicle body is downwardly inclined in the rightward direction and this is detected by the inclination sensor, the left-hand solenoid is actuated to pull the left-hand shutter downwardly so as to allow the left-hand opening portion to be opened thereby to correct rightward variation of the property of light orientation and when the vehicle body is downwardly inclined in the leftward direction and this is detected by the inclination sensor, the right-hand solenoid is actuated to pull the right-hand solenoid downwardly so as to allow the right-hand opening portion to be opened thereby to correct leftward variation of the property of light orientation.

Further, according to other aspect of the present invention, there is provided a projector type head lamp for a cornering operation including inclination detecting means for detecting inclination of a vehicle body relative to the road surface and correcting means for correcting variation of a property of light orientation induced by the inclination of the vehicle body relative to the road surface, wherein the correcting means is constituted by a circular liquid crystal element which serves also as a light shielding plate disposed in the head lamp, the liquid crystal element including a plurality of segments each adapted to be selectively driven.

In the case where variation of the property of light orientation is corrected in the aforementioned electrical manner, the liquid crystal element comprises a liquid crystal having a large ratio of optical contrast at the time it is held in a light permeable state to optical contrast at the time when it is held in a light impermeable state. In practice, it is ,desirable that the liquid crystal element comprises a supertwist nematic liquid crystal. A center of the liquid crystal coincides with an optical axis of the head lamp.

The liquid crystal is constructed such that four sector-shaped ranges radially expanding from the center of a circle with an angle of 45 degrees above and below a reference line horizontally passing through the optical axis are divided into fifteen radially extending segments each of which radially expands in the small sector-shaped configuration with an angle of 3 degrees. Two sector-shaped ranges above the reference line are normally held in a light permeable state and another two sector-shaped ranges below the reference line are normally held in a light impermeable state.

When the vehicle body is downwardly inclined and this is detected by the inclination sensor serving as inclination detecting means, some of the segment in one sector-shaped range above the reference line are selectively driven in response to an output from the inclination sensor depending on an extent of inclination of the vehicle body so as to allow the selected segments to become light permeable and the same number of segments in opposite sector-shaped range to the foregoing one below the reference line are likewise selectively driven so as to allow the selected segments to become light impermeable.

Alternatively, the liquid crystal element may be constructed by a plurality of horizontally extending stripe-shaped segments. Also in this case, a half of the segments above the reference line is normally held in a light permeable state and other half of the segments below the reference line is normally held in a light impermeable state.

When the vehicle body is downwardly inclined and this is detected by the inclination sensor, some of the segments are selectively driven in response to an output from the inclination sensor depending on an extent of inclination of the vehicle body so as to allow the selected segments to become partially light impermeable depending on the inclined state of respective wheels and the same number of segments below the reference line are likewise selectively driven so as to allow the selected segments to become partially light permeable depending on the inclined state of the respective wheels.

Other objects, features and advantages of the present invention will become apparent from reading of the following description which has been made in conjunction with the accompanying drawings.

BRIEF DESCRIPTION OF THE DRAWINGS

The present invention is illustrated in the following drawings in which.

DESCRIPTION OF THE PREFERRED EMBODIMENTS

Now, the present invention will be described in detail hereinafter with reference to the accompanying drawings which illustrate preferred embodiment of the present invention.

Figure 1:
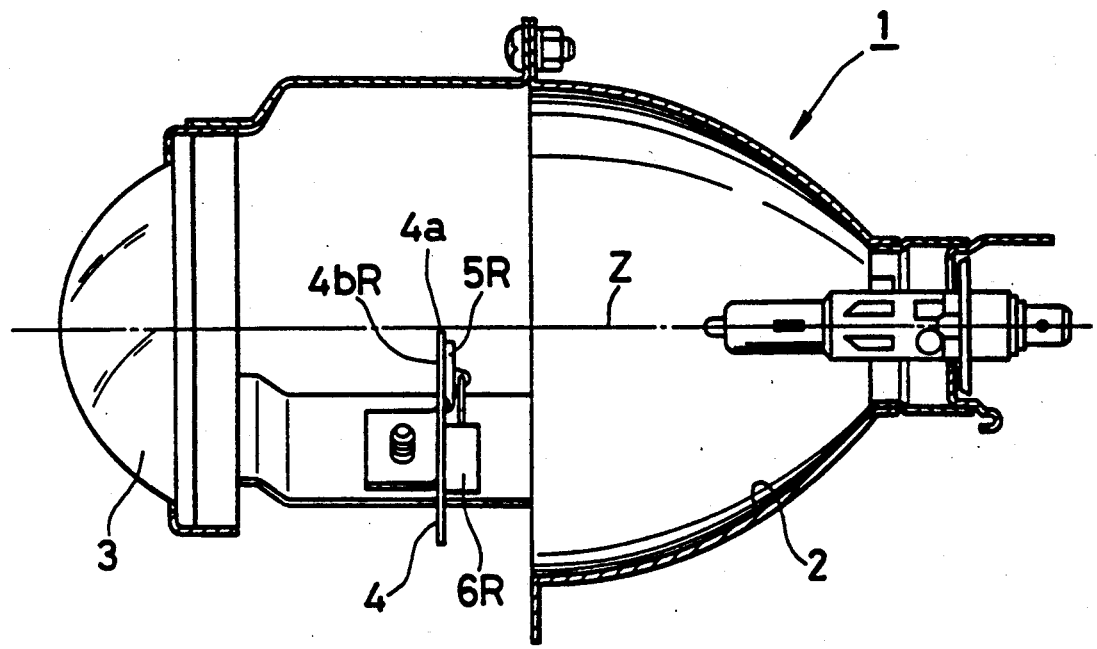
FIG. 1 is a sectional side view of a cornering head lamp in accordance with a first embodiment of the present invention.

A first embodiment of the present invention will be described below with reference to FIG. 1 to FIG. 3. Referring to FIG. 1, a cornering head lamp is generally designated by reference numeral 1. In this embodiment, the head lamp 1 is designed in the form of a projector type head lamp which is composed of a reflective mirror 2 having a rotational paraboloid with a light source located at one focus thereof, a projection lens 3 having the same optical axis Z as that of the reflective mirror 2 at the position in the vicinity of other focus of the reflective mirror 2 and a light shielding plate 4 disposed in the vicinity of the focus of the projection lens 3.

In contrast with the conventional cornering head lamp which has been described above with reference to FIG. 9, correcting means for correcting variation of a property of light orientation in response to an output from detecting means for detecting inclination of a vehicle body (not shown) relative to the road surface is not turned about the optical axis Z but it is fixedly secured to the vehicle body. In practice, the correcting means is mounted on the light shielding plate 4.

Figure 2:
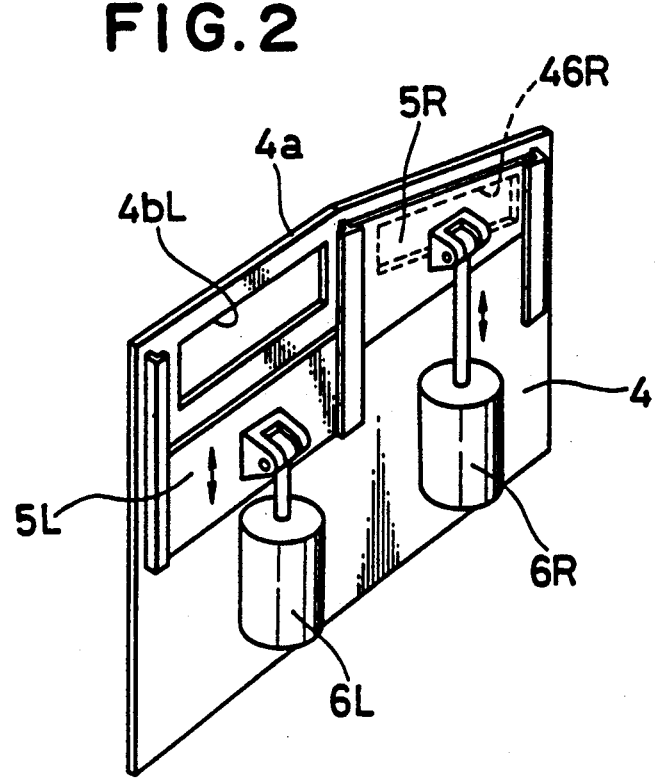
FIG. 2 is a perspective view which illustrates essential components for the cornering head lamp in FIG. 1 as seen from the behind.
Figure 3:
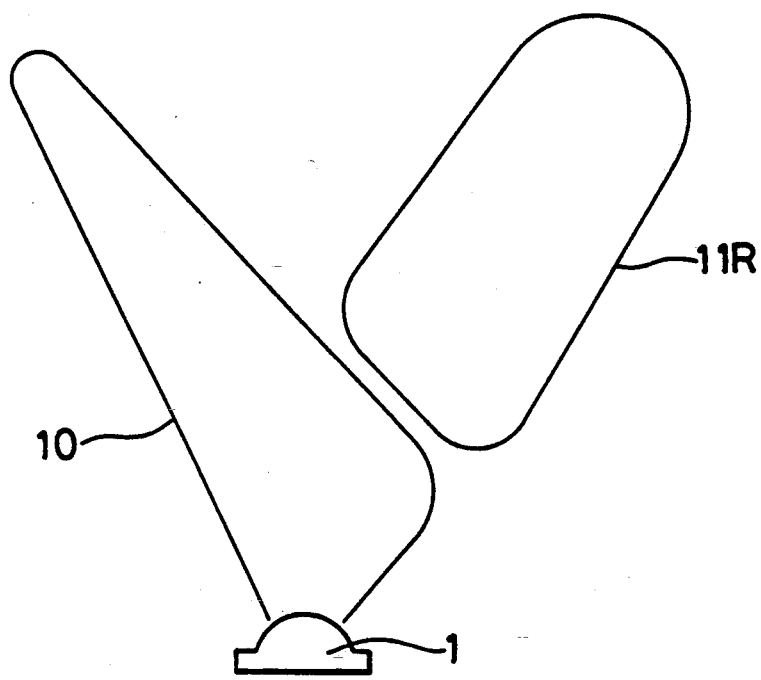
FIG. 3 is a schematic plan view which illustrates a function of the cornering head lamp of the present invention.

FIG. 2 is a perspective view which shows a structure of the light shielding plate 4 as seen from the behind. The light shielding plate 4 is made of a suitable material, e.g., a metallic plate, and a part of the light shielding plate 4 located adjacent to the optical axis Z is contoured in the form of a boundary edge 4a serving to determine a boundary between an illuminating part and a non-illuminating part in connection with the property of light orientation.

According to the present invention, the correcting means is embodied by arranging a right-hand opening portion 4bR and a left-hand opening portion 4bL adjacent to the boundary edge 4a in the symmetrical relationship relative to the optical axis Z. In the case as shown in FIG. 2, the both opening portions 4bR and 4bL are configured to exhibit a rectangle of which upper and lower long sides extend in parallel with the boundary edge 4a, respectively. Thus, the both long sides of the opening portions 4bR and 4bL extend in the horizontal direction.

It should be noted that the positions of the both opening portions 4bR and 4bL as viewed in the lateral direction of the motorcycle are determined based on the direction of running of the motorcycle. In addition, the shape of each of the opening portions 4bR and 4bL should not be limited only to a rectangle. Alternatively, a sector-shaped contour expanding with the optical axis as a center may be employed for the opening portions 4bR and 4bL.

Further, right-hand shutter 5R and a right-hand solenoid 6R are arranged for the right-hand opening portion 4bR to serve as opening/closing means, while a left-hand shutter 5L and a left-hand solenoid 6L are arranged for the left-hand opening portion 4bL for the same purpose. Normally, the both opening portions 4bR and 4bL are closed with the shutters 5R and 5L by actuating the solenoids 6R and 6L. While the foregoing closed state is maintained, since no output is generated from inclination detecting means (not shown) mounted on the vehicle body in the same manner as the conventional cornering head lamp, the resultant property of light orientation is entirely same to that of the conventional projector type head lamp which has been heretofore used.

When the vehicle body is downwardly inclined, e.g., in the rightward direction because of turning movement of the motorcycle in the rightward direction, the property of light orientation of the cornering head lamp 31 is naturally shifted to the rightward/downward inclination property which in turn is detected by the inclination detecting means to generate a corresponding output.

In response to an output from the inclination detecting means, the left-hand solenoid 6L is actuated to pull the left-hand shutter 5L downwardly, whereby the left-hand opening portion 4bL is opened. This causes right-hand corrective light 11R irradiated through the opened left-hand opening portion 4bL to be projected over the zone located rightward and upward of the zone having a property 10 of rightward/downward light orientation. Consequently, intended correction is accomplished satisfactorily.

While no output is generated from the inclination detecting means, it is natural that the left-hand solenoid 6L is restored to the original position and thereby the left-hand opening portion 4bL is closed with the shutter 5L, resulting in the property of light orientation being restored to the normal one.

To the contrary, when the vehicle body is downwardly inclined in the leftward direction, the right-hand solenoid 6R is actuated in response to an output from the inclination detecting means to pull the right-hand shutter 5R downwardly in the same manner as mentioned above, whereby the right-hand opening portion 4bR is opened. At this time, the same functional effect as that in the case of rightward/downward inclination of the vehicle body is obtainable. Thus, repeated description will not be required.

As is apparent from the above description, according to the present invention, a specific operation required for correcting the property of light orientation is merely opening/closing operations. Thus, this makes it possible to simply construct the left-hand and right-hand shutters 5L and 5R and the left-hand and right-hand solenoids 6L and 6R serving as light shielding means in smaller dimensions with light weight.

As described above, the cornering head lamp in accordance with the first embodiment of the present invention has a characterizing feature that correcting means for correcting variation of a property of light orientation in response to an output from detecting means for detecting inclination of a vehicle body relative to the ground surface is constructed such that a pair of opening portions each having a substantially rectangular shape of which upper and lower long sides extend in the substantially horizontal direction are formed in the vicinity of the boundary edge of a light shielding pate disposed in a projector type head lamp and each of the opening portions is opened and closed by opening/closing means in response to an output from the inclination detecting means. With this construction, the cornering head lamp does not requires large complicated driving means for turning the whole head lamp which has been described above with respect to the conventional cornering head lamp. Since the cornering head lamp is designed in smaller dimensions with light weight, it can easily be mounted on a motorcycle which has required such a small and light cornering head lamp as mentioned above.

Next, a second embodiment of the present invention will be described below with reference to FIG. 4 to FIG. 7. In this embodiment, a cornering head lamp 101 is designed likewise in the form of projector type head lamp which is composed of a light shielding plate 105 disposed in the vicinity of the focus of the projection lens 104 in the substantially same manner as the cornering head lamp in accordance with the first embodiment of the present invention which has been described above with reference to FIG. 1 to FIG. 3 with the exception that the light shielding plate 105 is constituted by a liquid crystal element 106.

Figure 5:
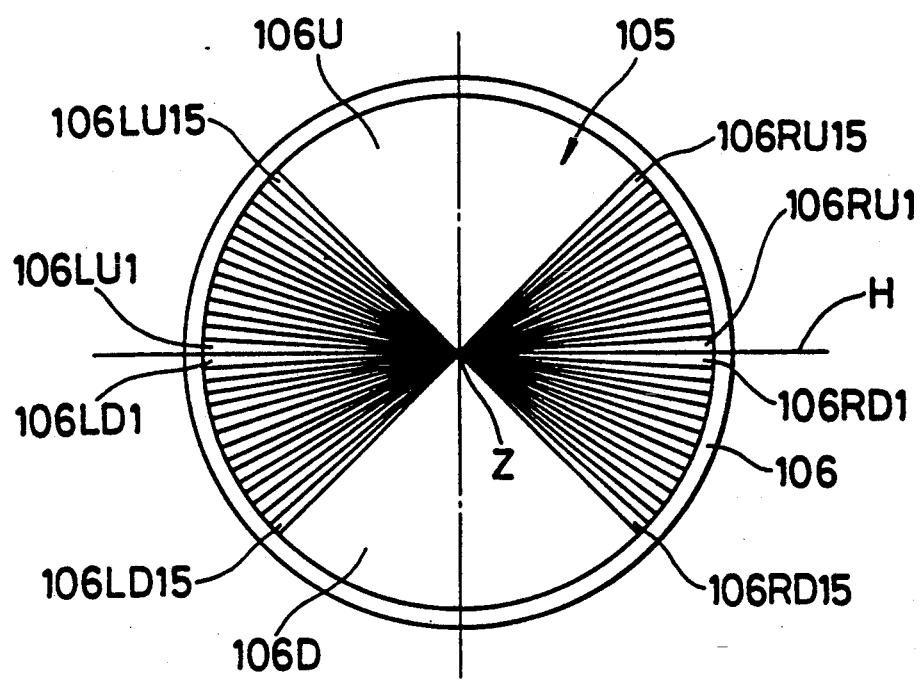
FIG. 5 is a front view of a liquid crystal element for the cornering head lamp in FIG. 4.

FIG. 5 is a front view which schematically illustrates the light shielding plate 105 that is an essential component constituting the cornering head lamp in accordance with the second embodiment of the present invention. In practice, it is desirable that the liquid crystal element 106 having a large ratio of optical contrast at the time when the liquid crystal is held in a light permeable state to optical contract at the time when the liquid crystal is held in a light impermeable state, e.g., a, supertwist nematic liquid crystal is employed for the light shielding plate 105. As is apparent from the drawing, the liquid crystal element 106 is constructed such that four ranges radially expanding from the optical axis Z in the sector-shaped configuration with an angle of 45 degrees above and below a reference line H passing through the optical axis Z are divided into radially extending right/upper segments 106RU1 to 106RU15, right/lower segments 106RD1 to 106RD15, left/upper segments 106LU1 to 106LU15 and left/lower segments 106LD1 to 106LD15, wherein the respective segments 106RU1 to 106RU15, 106RD1 to 106RD15, 106LU1 to 106LU15 and 106LD1 to 106LD 15 radially expand in the small sector-shaped configuration with an angle of 3 degrees and can be driven individually.

An upper sector-shaped portion 106U and a lower sector-shaped portion 106D exclusive of the aforementioned divided four ranges may be constituted by the same liquid crystal as the liquid crystal element 106. Alternatively, since the upper sector-shaped portion 106U is normally held in the light permeable state, it may be constituted by a light permeable material. On the other hand, since the lower sector-shaped portion 106D is normally held in the light impermeable state, it may be constituted by a light impermeable material.

Next, practical usage of the cornering head lamp 101 constructed in the above-described manner will be described below.

To simplify description and facilitate understanding of the description, practical usage of the cornering front lamp 101 will be described below on the assumption that a property of light orientation required for the cornering front lamp 101 is concerned mainly with a semicircle below the reference line H.

First, when a vehicle body (not shown) stands upright, the cornering head lamp 101 is not required to carry out correction for the property of light orientation because no variation occurs. For the reason, all the segments 106RD1 to 106RD15 and 106LD1 to 106LD1 to 106LD15 in the liquid crystal element 106 located below the reference line H are held in the light impermeable state.

Figure 4:
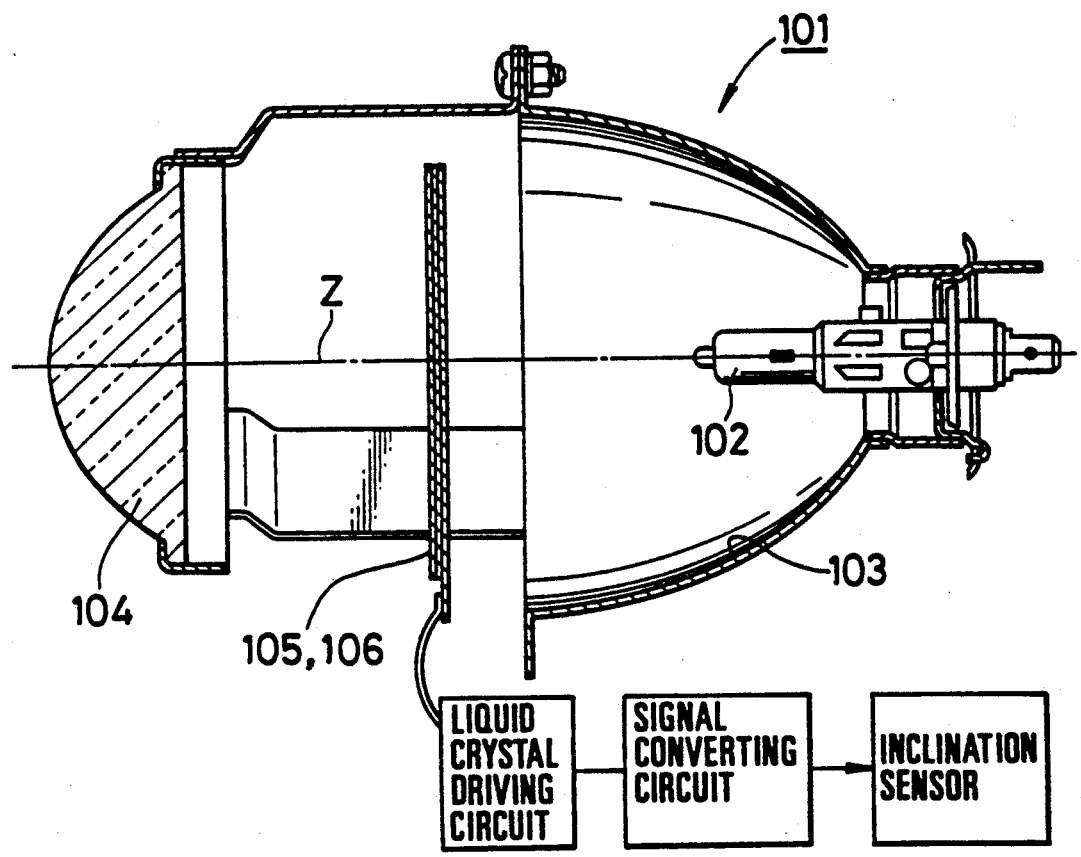
FIG. 4 is a sectional side view of a cornering head lamp in accordance with a second embodiment of the present invention.
Figure 9:
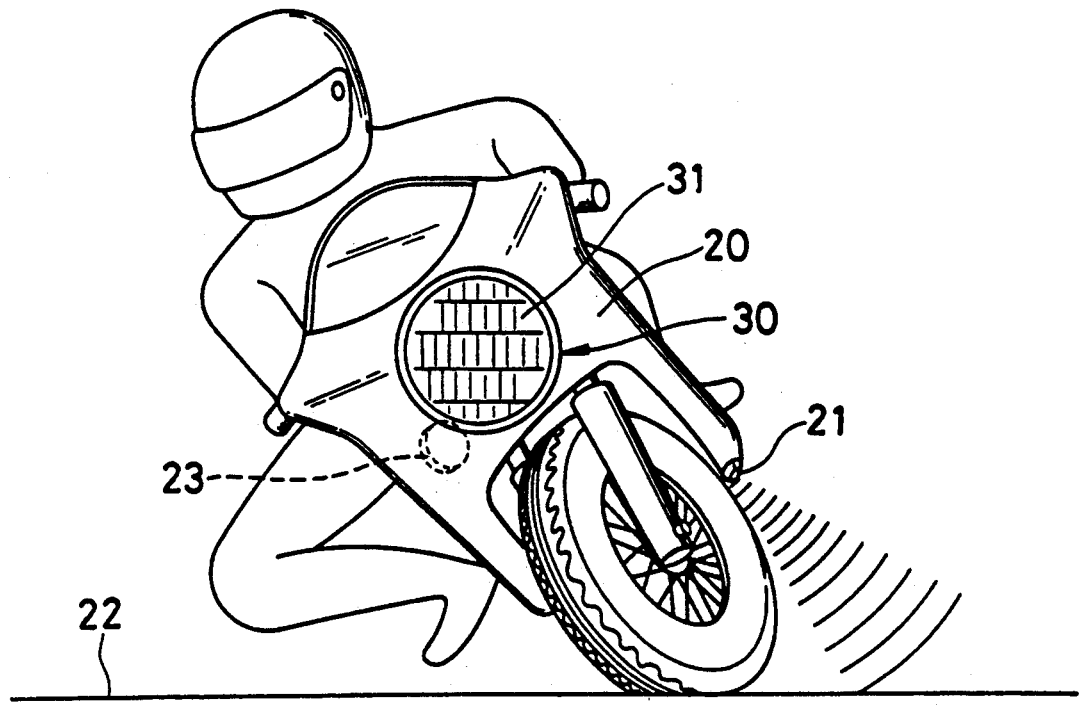
FIG. 9 is an illustrative view which shows arrangement of a conventional cornering head lamp.

The liquid crystal element 106 is driven in response to an output from the inclination sensor which has been described above with respect to the conventional cornering head lamp with reference to FIG. 9. For example, in a case where the inclination sensor is constructed such that an extent of inclination is indicated in the form of a voltage signal, it is naturally necessary that the inclination sensor is additionally provided with a signal converting circuit and a liquid crystal driving circuit each adapted to be actuated by a microcomputer or the like unit in order to properly drive the liquid crystal element 106, as shown in FIG. 4.

Next, when the vehicle body is downwardly inclined in the rightward direction, e.g., by an angle of 3 degrees during a cornering operation or the like, the cornering head lamp 101 is naturally inclined in the rightward direction by the same angle. This causes the property of light orientation to assume an inclined state corresponding to the inclination of the vehicle body in the rightward direction by an angle of 3 degrees.

Figure 6:
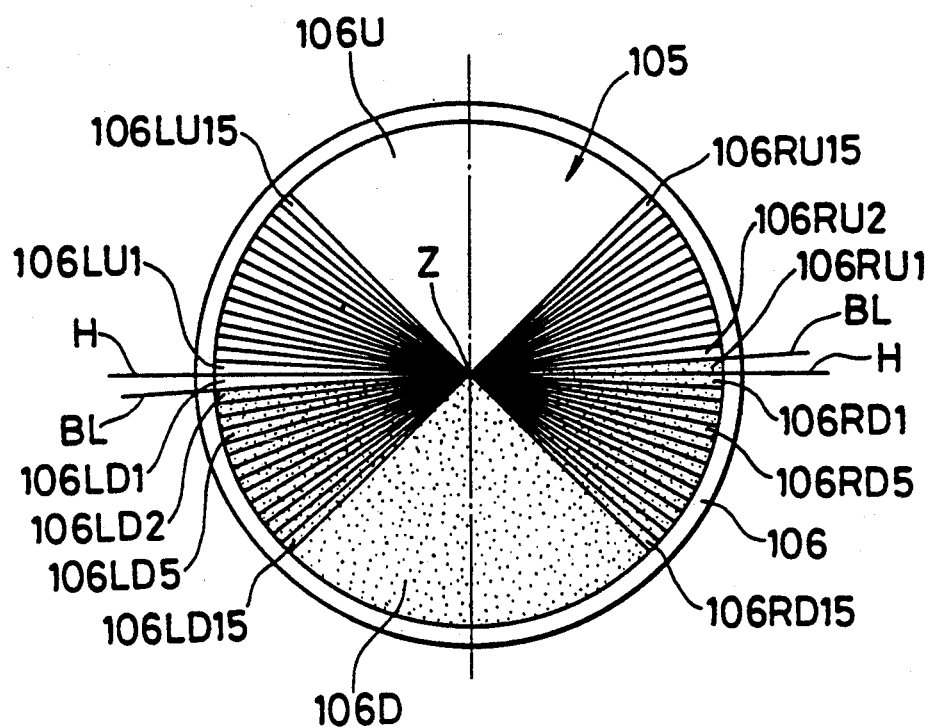
FIG. 6 is an illustrative view similar to FIG. 5, particularly showing a function of the liquid crystal element.

At this time, in response to an output from the inclination sensor, the right/upper segment 106RU1 becomes light impermeable and the left/lower segment 106LD1 becomes light permeable, whereby a new boundary line BL defining the semicircle of the liquid crystal element 106 which has been held in the light impermeable state is formed as shown in FIG. 6 while orienting in the horizontal direction. Consequently, the property of light orientation for allowing light beam to be irradiated to the ground surface does not vary regardless of the foregoing inclination of the vehicle body.

Similarly, when the vehicle body is downwardly inclined in the rightward direction by an angle of 6 degrees, the right/upper segments 106RU1 and 106RU2 become light impermeable and the left/lower 106LD1 and 106LD2 become light permeable. At this time, the boundary line BL orients in the horizontal direction. Consequently, the property of light orientation does not vary in respect of the foregoing inclination of the vehicle body.

According to the present invention, since variation of the property of light orientation is corrected by optically shifting the selected number of segments in the liquid crystal element 106, this makes it possible for variation of the property of light orientation to be corrected by electronic means without necessity for mechanically movable components or members.

Of course, things are same when the vehicle body is downwardly inclined in the leftward direction. Also in this case, variation of the property of light orientation can be corrected in the same manner as mentioned above. Thus, repeated description will not be required.

Figure 7A:
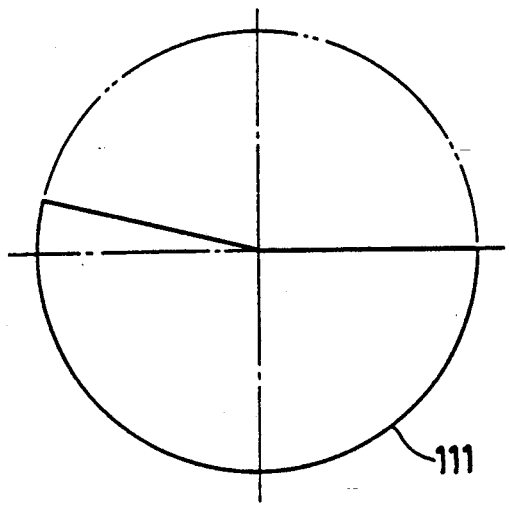
FIGS. 7(A) and 7(B) are an illustrative view which schematically shows by way of example modification of the liquid crystal element for the cornering head lamp of the present invention, respectively.
Figure 7B:
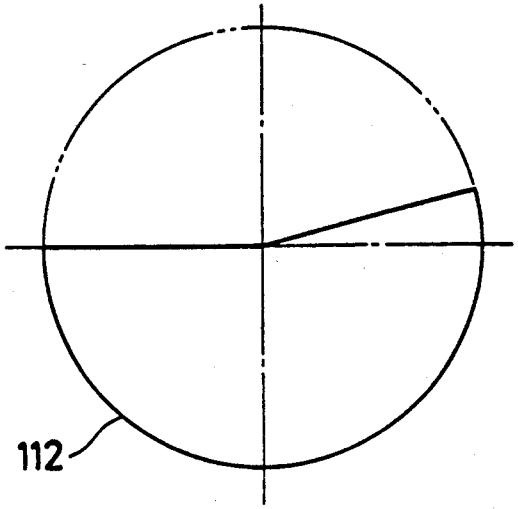

In a country where vehicles run along the left side of a road, the property of light orientation practically employed for the cornering head lamp is modified such that a raise angle of, e.g., 15 degrees is added to the left half of the semicircle of the light impermeable part as represented by a curve 111 of the property of light orientation in FIG. 7(A) so as to allow a driver to easily visually recognize sign boards on the left side of a road. To the contrary, in a country where vehicle run along the right side of a road, the property of light orientation is modified such that a raise angle of, e.g., 15 degrees is added to the right half of the semicircle of the light impermeable part as represented by a curve 112 of the property of light orientation in FIG. 7(B).

Therefore, when the cornering front lamp 101 is used in a country where vehicles run along the left side of a road, the right/lower segments 106RD1 to 106RD5 are held in the light permeable state while the vehicle body stands upright, i.e., it is held in the initial state. In this case, it is required that correction is later accomplished with the foregoing state as a reference. Similarly, when the cornering front lamp 101 is used in a country where vehicles run along the right side of a road, the left/lower segments 106LD1 to 106LD5 are held in the light permeable state while the vehicle body is held in the initial state. This means that the cornering front lamp 101 can be used in either of the two cases, one of them being that it is used in a country where vehicles run along the left side of a road and the other one being that it is used in a country where vehicles run along the right side of a road, provided that, e.g., the signal processing circuit attached to the inclination sensor (see FIG. 4) executes a step of adequate processing. Accordingly, as far as the liquid crystal element 106 is constructed in the above-described manner, usage of an assembly of the liquid crystal element 106 and the light shielding plate 105 can be changed from the case where the cornering head lamp 101 is used in a country where vehicles run along the left side of a road to the case where it is used in a country where vehicle run along the right side of a road and vice versa.

Figure 8:
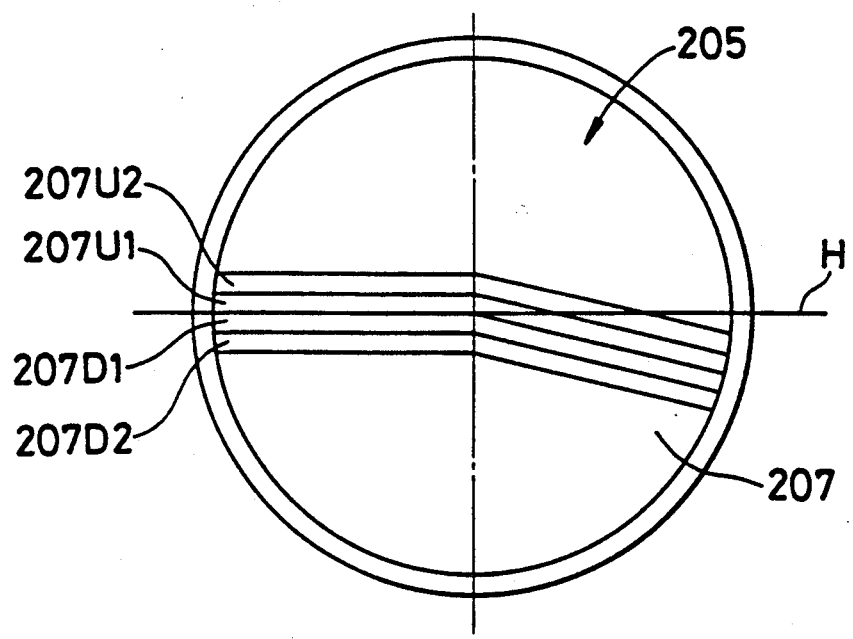
FIG. 8 is a front view of a liquid crystal element for a cornering head lamp in accordance with a third embodiment of the present invention.

Next, a third embodiment of the present invention will be described below with reference to FIG. 8. The aforementioned embodiments are concerned mainly with correction for inclination of the vehicle body. In contrast with them, this embodiment is intended to properly correct a phenomenon that the direction of irradiation of light beam fluctuates depending on variation of a load to be carried by an automotive vehicle, e.g., having four wheels. To this end, according to this embodiment, a liquid crystal element 207 is divided into a suitable number of horizontally extending stripe-shaped segments above and below the horizontal line H as a reference, e.g., upper segments 207U1, 207U2 and others and lower segments 207D1, 207D2 and others. When the vehicle body is inclined to assume a raised state with the fore end part of the vehicle body raised up, some of the upper segments 207U1, 207U2 and others are selected for the purpose of correcting variation of a property of light orientation in response to an output from detecting means for detecting inclination of the vehicle body relative to the road surface. On the other hand, when the vehicle body is inclined to assume a lowered state with the fore end part of the vehicle body lowered, some of the lower segments 207D1, 207D2 and others are selected for the same purpose.

Of course, a combination of the second embodiment and the third embodiment may equally be applicable to a cornering head lamp of the present invention.

As will be apparent from the above description, a cornering head lamp in accordance with the second embodiment and the third embodiment of the present invention has a characterizing feature that a light shielding plate serving as correcting means for correcting variation of a property of light orientation in response from an output signal from detecting means for detecting inclination of a vehicle body relative to the road surface is provided in the form of a liquid crystal element including a plurality of segments each selectively driven in response to the output signal. This makes it possible to accomplish correction of variation of the property of light orientation by electrical means for changing the number of available segments without necessity for mechanically movable components or members, resulting in reliability of the cornering head lamp being improved substantially.

In addition, since the light shielding plate is constituted by a liquid crystal element in the above-described manner, a pattern of the property of light orientation can arbitrarily be changed depending on preliminary designing of the segments even after the cornering head lamp is mounted on the vehicle body. Therefore, the cornering head lamp of the present invention can be used not only in a country where vehicles run along the left side of a road but also in a country where vehicle run along the right side of a road.

While the present invention has been described above with respect to a few preferred embodiments thereof, it should of course be understood that the present invention should not be limited only to these embodiments but various changes or modifications may be made without departure from the scope of the invention as claimed by the appended claims.

What is claimed is:

1. A projector type head lamp with an optical axis for a cornering operation comprising:
   inclination detecting means for detecting inclination of a vehicle body relative to a road surface; and
   correcting means for correcting variation of a property of light orientation induced by said inclination of said vehicle body relative to the road surface,
   wherein said correcting means is constituted by a circular liquid crystal element which serves also as a light shielding plate disposed in said head lamp, said circular liquid crystal element being constructed such that a plurality of sector-shaped ranges radially expands from the center of a circle with an angle of 45 degrees above and below a reference line horizontally passing through said optical axis, each sector-shaped range being divided into fifteen radially extending segments each of which radially expands as a small sector-shaped configuration with an angle of 3 degrees.

2. The projector type head lamp as claimed in claim 1, wherein two sector-shaped ranges above said reference line are normally held in a light permeable state and another two sector-shaped ranges below said reference line are normally held in a light impermeable state.

3. The projector type head lamp as claimed in claim 1, wherein when the vehicle body is downwardly inclined and detected by said inclination detecting means, some of said radially extending segments in one sector-shaped range above said reference line are selectively driven in response to an output from said inclination detecting means depending on an extent of inclination of the vehicle body so as to allow the selected radially extending segments to become light impermeable and a same number of redially extending segments in opposite sector-shaped range to the foregoing one below said reference line are likewise selectively driven so as to allow the selected radially extending segments to become light permeable.

* * * * *